United States Patent
Landry et al.

(10) Patent No.: US 7,275,878 B2
(45) Date of Patent: Oct. 2, 2007

(54) ATTENUATED BARREL SELECTION ALGORITHMS

(75) Inventors: Gary Landry, Allen, TX (US); Norman Brent Stapleton, Princeton, TX (US); James K. Guenter, Garland, TX (US); Jimmy A. Tatum, Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/130,511

(22) Filed: May 17, 2005

(65) Prior Publication Data

US 2006/0263014 A1   Nov. 23, 2006

(51) Int. Cl.
*G02B 6/42* (2006.01)
*H04B 10/04* (2006.01)

(52) U.S. Cl. ............... 385/92; 385/140; 398/186; 398/200

(58) Field of Classification Search ............ 385/92, 385/140; 398/186, 200
See application file for complete search history.

(56) References Cited

U.S. PATENT DOCUMENTS 5,309,542 A * 5/1994 Strope et al. ............... 385/140
6,061,493 A * 5/2000 Gilliland et al. ............ 385/140

\* cited by examiner

*Primary Examiner*—Kevin S Wood
*Assistant Examiner*—Jerry T. Rahill
(74) *Attorney, Agent, or Firm*—Workman Nydegger (57) ABSTRACT

The present invention relates to controlling parameters of an optical output of an optical transmitter. An optical package can be selected based on a level of attenuation of a parameter of a transmitter output by the optical package. The laser and the optical package can be assembled and a parameter of the transmitter output can be measured. An optical barrel can be selected based on the measurement, wherein the optical barrel is selected based on an attenuation level to satisfy a range of a desired parameter value. The optical package and the optical barrel can be assembled. A system for assembling the optical device is also described.

17 Claims, 6 Drawing Sheets

ATTENUATED BARREL SELECTION ALGORITHMS

BACKGROUND OF THE INVENTION

1. The Field of the Invention

The present invention is related generally to optical signal transmission. More specifically, the present invention relates control of optical transmission parameters.

2. Related Technology

High-speed communication networks have become of increased importance as the need to transmit large amounts of data continues to rise. Networks employing fiber optic technology are known as optical communications networks, and are typically characterized by high bandwidth and reliable, high-speed data transmission. Fiber optic technology is increasingly employed in the transmission of data over high-speed communications networks.

To communicate over a network using fiber optic technology, fiber optic components such as fiber optic transceivers are used to send and receive optical data. Generally, a fiber optic transceiver can include one or more optical subassemblies ("OSA") such as a transmitter optical subassembly ("TOSA") for sending optical signals, and a receiver optical subassembly ("ROSA") for receiving optical signals. More particularly, the TOSA receives an electrical data signal and converts the electrical data signal into an optical data signal for transmission onto an optical network. The ROSA receives an optical data signal from the optical network and converts the received optical data signal to an electrical data signal for further use and/or processing. Both the ROSA and the TOSA include specific optical components for performing such functions.

In particular, a typical TOSA can include an optical transmitter, such as a laser, for sending an optical signal. Many different types of lasers are known to those skilled in the art. One type of laser referred to as a vertical cavity surface emitting laser ("VCSEL") emits light in a single direction through an upper surface of the laser structure. Many different optical packages can be used to house an optical transmitter. One common datacom-grade laser diode package is the so-called TO-can package. The TO-can package comes in a variety of sizes and configurations. The TO-can package can be further assembled with a variety of optical barrels, such as LC and SC barrels for aligning and coupling the optical transmitter with an optical fiber.

The TOSA may further include additional components. The TOSA can include a monitor, such as a photodiode, that generates feedback concerning performance parameters of the laser. In certain applications, the laser (e.g., a VCSEL) emission must be monitored to determine whether the power of the emitted light exceeds certain predetermined threshold magnitudes (i.e. a tolerance of a desired value). The monitoring function may be used to avoid any possible danger from the emission of unacceptably high power levels from the laser. The monitoring function may also be necessary in order to maintain a required level of average optical power necessary to obtain the desired optical modulation amplitude for a given on/off extinction ratio.

Semiconductor lasers are typically manufactured using methods of epitaxial growth upon a substrate. Many lasers can be manufactured at one time in the form of a wafer. Manufactured lasers, however, often differ in several different output parameters. In addition, for a laser to be operated at high speeds it is often required to operate the laser at levels that may produce optical output parameters that do not meet industrial specifications and requirements. Thus, compensation for different parameters of optical output of lasers must be conducted so that each device containing a laser that is sold satisfies various conditions.

One way that the various parameters of lasers are compensated for is attenuation. Attenuation of various parameters can be accomplished using various methods and apparatus known to one of ordinary skill. Selection and application of attenuation can be a critical process for successful production of VCSEL TOSAs meeting eye safe requirements for 10 Gbps Ethernet. Such a requirement can be set by industry standards, such as defined in the IEEE 802.3 ae standard. Two factors that may attribute to the need for attenuation are the need to bias a VCSEL at a substantial multiple of lasing threshold current to meet the dynamic performance requirements of operation (e.g. rise/fall times, ringing, eye mask, jitter), and tightly controlling the manufacturing distributions of the parts to meet all of the demanding requirements for an application. These requirements can become more stringent as the speed of a transmission system increases.

One method of attenuation is to use a window of an optical package to attenuate the optical signal transmitted from the VCSEL so that the optical signal satisfies several conditions. Because the conditions that must be satisfied are stricter at higher rates of data transmission, often there must be many more packages with different attenuation for these transmitters. For example, a system operating at 10 Gbps may require several times more optical packages with different attenuation to adjust output parameters of a VCSEL than that required for a system operating at 4 Gbps due to differences in the standards defined link budgets. Thus, manufacturers of high speed laser packages, assemblies, and devices have typically been required to keep many more packages on hand with many different attenuation characteristics to adjust optical output parameters of the lasers to meet industry conditions and requirements.

Therefore, for the reasons stated above, as well as others, an advantageous aspect of the present invention is improved methods and apparatuses for controlling output parameters of a TOSA.

BRIEF SUMMARY OF THE INVENTION

The present invention relates to controlling the optical output of an optical transmitter. A method for assembling an optical device is described. The method can include the acts of providing a laser for producing an optical output, selecting an optical package based on a level of attenuation of a parameter of the laser output by the optical package, assembling the laser and the optical package, measuring the parameter of the optical output attenuated by the optical package, selecting an optical barrel based on the measurement, wherein the optical barrel is selected based on an attenuation level to satisfy a condition, and assembling the optical package and the optical barrel.

A system for assembling an optical device is described. The system can include a first component for assembling a laser with an optical package, wherein the optical package provides a course attenuation of a parameter of the optical output to meet a condition. The system can further include a testing component for testing the parameter of the optical output of the laser, and a second component for selecting an optical barrel with an attenuation level from a plurality of optical barrels with different attenuation levels, wherein the optical barrel is selected based on a result of the test to attenuate the parameter of the optical output to satisfy a condition. The system can further include a third component for assembling the optical package and the optical barrel selected.

An optical device is described. The optical device can include a laser, an optical package coupled to the laser, wherein the optical package is selected from several different optical packages with different attenuation based on the level of attenuation of the optical signal by the optical package, and an optical barrel coupled to the optical package, wherein the optical barrel is selected from several different optical barrels with different attenuation based on a measurement of a parameter of the optical output of the laser and a level of attenuation of the optical signal by the optical barrel to meet a condition.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed toward controlling an optical output from a laser so that the laser conforms, along with other lasers, to optical output conditions and requirements. The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention. Descriptions of well-known components and processing techniques are omitted so as not to unnecessarily obscure the invention in detail.

Figure 1:
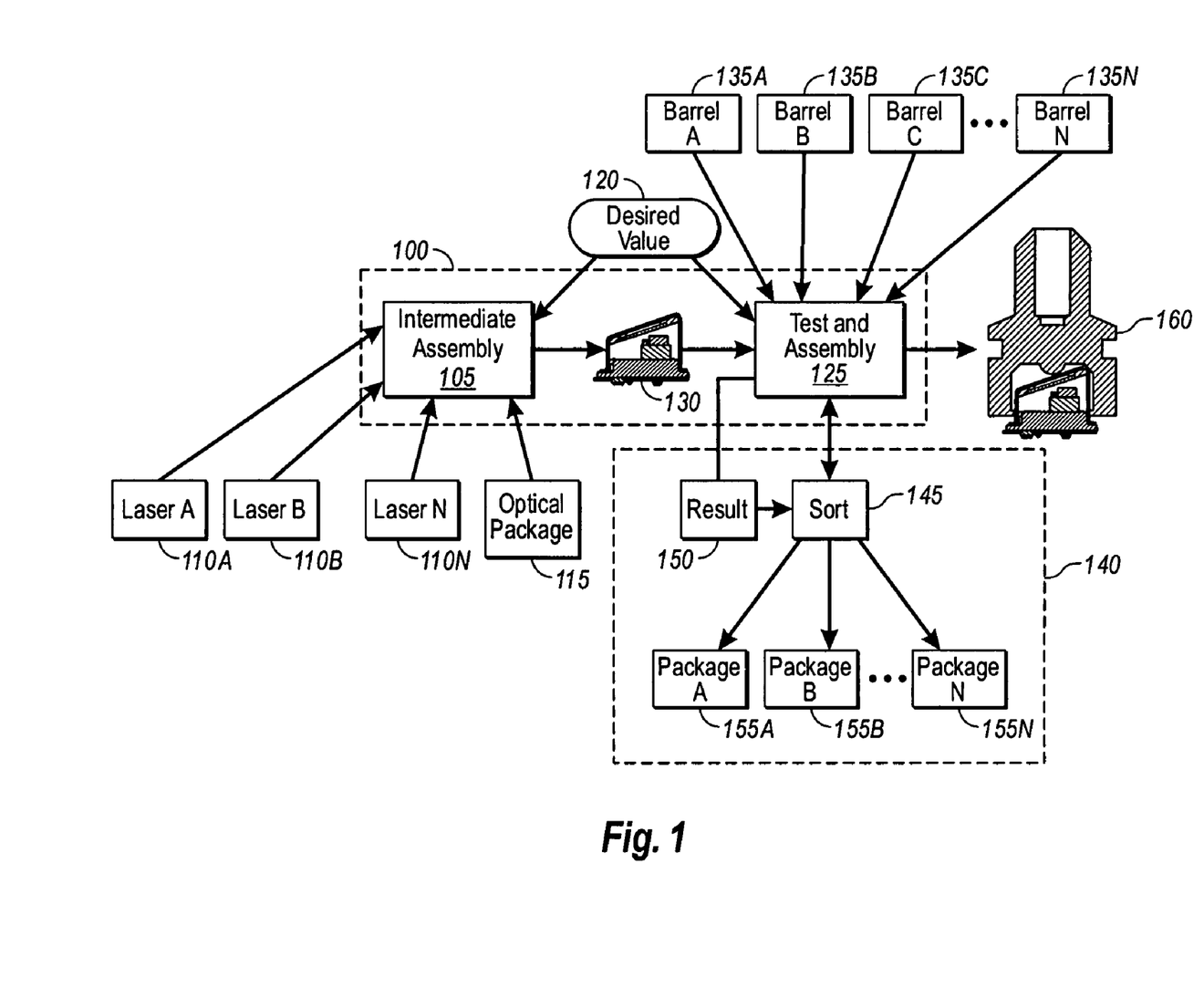
FIG. 1 illustrates a system for assembling an optical device according to an example embodiment of the present invention.

Referring to FIG. 1, a system 100 for assembling an optical device 160 is shown according to an example embodiment of the present invention. An intermediate assembly component 105 can receive a laser (e.g. laser 110A) along with an optical package 115. The intermediate assembly component 105 can receive several lasers 110A-N at one time and the lasers 110A-N can be grouped along with other lasers 110A-N having similar output parameters. For example, lasers 110A and B from a common wafer may have more similar output parameters than laser 110N from a different wafer, and lasers 110A and B from the same wafer can be tested and/or grouped together and received by the intermediate assembly component 105 together. Assembly components 105 for assembling the laser 110A with the optical package 115 are generally well known to one of ordinary skill in the art and the assembly component 105 can include any device, assembly, or system for assembling the laser 110A with the optical package 115 into an intermediate optical device 130. Moreover the intermediate assembly component 105 can include assembly conducted by humans. For example, the intermediate assembly component 105 can include assembly at least in part carried out by humans in addition to, or combined with other assembly devices. Thus, the intermediate assembly component 105 can be embodied in any form or configuration that accomplishes the task of assembling a laser 110A with an optical package 115 into the intermediate optical device 130.

Assembly of the laser 110A with the package 115 can include several additional manufacturing processes and acts. For example, assembly by the intermediate assembly component 105 can include alignment and attaching processes. Additional manufacturing processes may be conducted prior to, or simultaneously with other assembly processes. For example, die attach, trimming, and other processes can be conducted during at least portions of the assembly of the intermediate optical device 130.

A desired optical output parameter 120 can be received by the intermediate assembly component 105, and the package 115 can be selected from several packages to adjust an unattenuated optical output parameter value of the laser 110A. Examples of parameters can include average optical power of the laser, slope efficiency of the laser, average operating current of the laser, optical modulation amplitude of the laser, and/or extinction ratio of the laser. The optical output parameter values may need to be attenuated to meet a predetermined range or threshold (i.e. a tolerance of a desired value). One reason that the optical output parameter values may need to be attenuated within a range is to satisfy a requirement. Requirements can include eye safety requirements, laser current requirements, reliability requirements, aging requirement, and industrial standard requirements.

In addition, the package 115 having a preselected attenuation can provide a course attenuation of the unattenuated optical output parameter value of the laser 110A to attenuate this unattenuated parameter value of the laser 110A close to the optical output parameter desired value 120. According to embodiments of the present invention, a single package 115 can be used to provide a course attenuation of the parameter, or multiple parameters, of every laser 110A-N. In this manner, the output parameter(s) of the lasers 110A-N can be controlled, and a course attenuation of the parameter(s) can be achieved allowing for additional refined attenuation of the laser as discussed herein below. In addition, it may be easier to test and measure the optical output parameter value once the laser 110A is assembled in the package 115.

Figure 2:
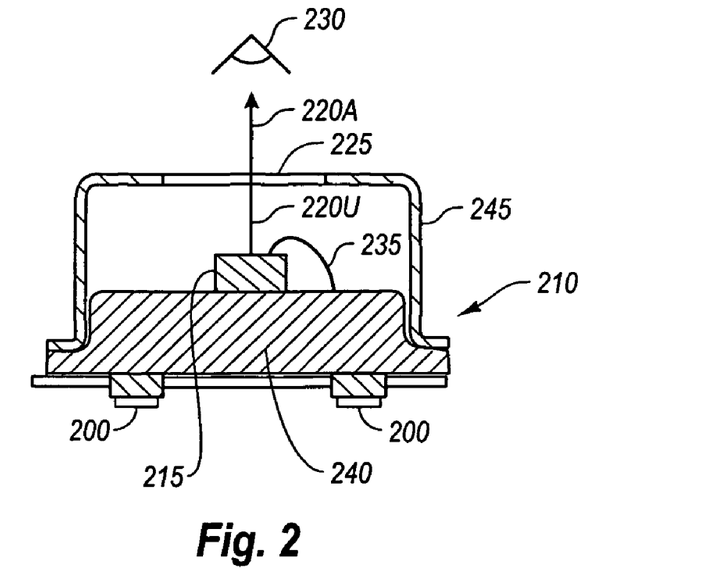
FIG. 2 illustrates an intermediate optical device under test according to an example embodiment of the present invention.

The intermediate optical device 130 can be forwarded to a test and assembly component 125 of the assembly system 100. The test and assembly component 125 can be separate and distinct components of the assembly system 100. Different components and devices of the assembly system 100 can also be combined into a single component or device. For example, the intermediate assembly component 105 can be combined with the assembly and test device 125 in a single component or unit. Similarly, the assembly and test device 125 can be two separate components, one for testing and one The test and assembly component 125 receives an optical output from the intermediate optical device 130 and measures a value of a parameter of the optical output received. For example, referring to FIG. 2, a current can be applied to electrical connections 200 of an intermediate optical device 210. A laser 215 produces an unattenuated optical output 220U that is transmitted through a window portion 225 of the assembled optical package 210. The window portion 225 can include an attenuation that attenuates a parameter of the unattenuated optical output 220U emitting an attenuated optical output 220A from the window 225. The attenuation can be selected to attenuate the unattenuated optical output 220U at a particular level so that that attenuated optical output 220A meets, or approaches, a desired optical output parameter value. The attenuated optical signal 220A can be received by an optical test apparatus 230 for receiving and analyzing at least one parameter value of the attenuated optical signal 220A. The optical test apparatus 230 can be any optical test apparatus for analyzing any parameter of the attenuated optical signal 220A. The optical test apparatus 230 can also monitor electrical parameters such as current supplied to the laser 215. For example, the optical test apparatus 230 can receive and evaluate average optical power of the laser, slope efficiency of the laser, average operating current of the laser, optical modulation amplitude of the laser, and extinction ratio of the laser 215. Additional devices in the package can also be monitored in this step such as a monitor photodiode current. The intermediate optical device 210 can include additional components, such as electrical connections 235 electrically coupled to the laser 215, a header 240, and a TO-can housing structure 245.

Referring again to FIG. 1, the test and assembly component 125 can receive a result of the test of the optical output parameter value of the intermediate optical device 130 and select an optical barrel (e.g. 135C) based on the result. The barrel 135C can be selected from a plurality of optical barrels 135A-N having different attenuation characteristics. For example several different sets of optical barrels 135A-N having attenuation characteristics can be received by the test and assembly component 125 and assembled with the intermediate optical device 130.

Figure 3:
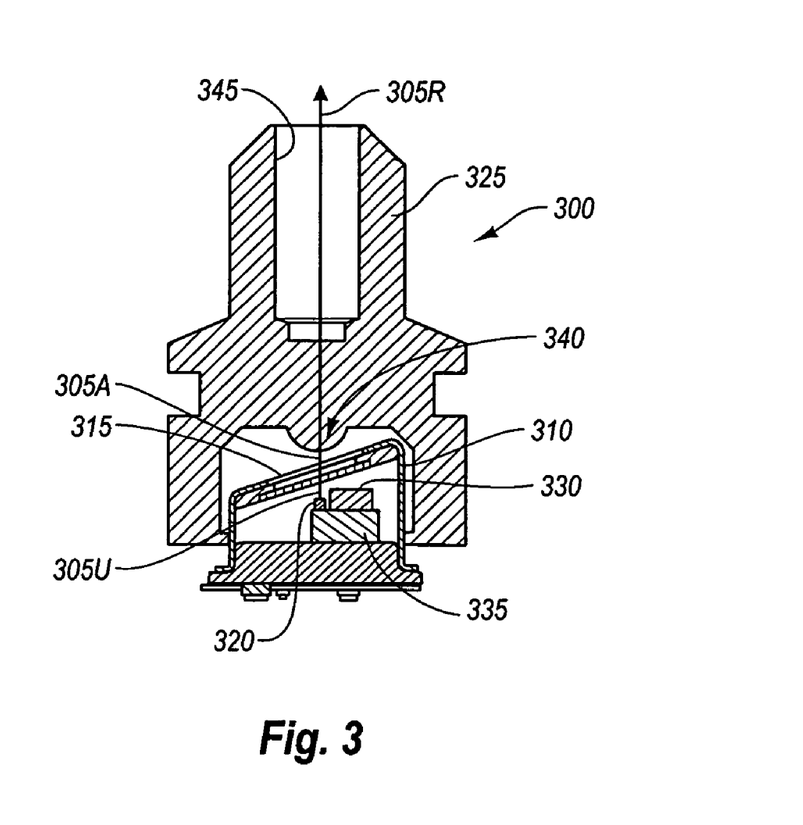
FIG. 3 illustrates an assembled optical device according to an example embodiment of the present invention.

Referring to FIG. 3, an assembled optical device 300 produces a refined optical output 305R that has an optical output parameter value that is within a tolerance of a desired optical output parameter value (e.g. desired value 120 in FIG. 1). Parameters of the refined optical output 305R can be achieved using components of the intermediate optical device 310. For example, an unattenuated optical output 305U can be attenuated using a tilted window 315 having a predetermined course attenuation to provide a first level of attenuation of the unattenuated optical output 305U of a VCSEL 320. A barrel 325 can provide a second refined level of attenuation of the attenuated optical output 305A of the VCSEL 320 thereby producing a refined optical output 305R. For example, providing the refined level of attenuation can closely conform the refined optical output 305R to the desired optical output parameter value, or multiple desired optical output parameter values. The assembled optical device 300 can also include additional components. For example, the assembled optical device 300 can include a monitor photodiode 330 and/or circuitry 335 for providing control of a current supplied to the VCSEL 320.

According to an embodiment of the present invention, the intermediate optical device 310 can be a TO-46 optical package with a tilted window 315 having a reflective coating on the inner surface of the window 315 to provide the course attenuation. A substantial amount of the total attenuation can be handled by the window 315, which can reflect a portion of the light emitted by the VCSEL 320 onto the photo detector 330 collocated in the intermediate optical device 310 next to the VCSEL 320. This coating also attenuates the output power of the unattenuated optical output 305U by partial reflection and attenuation.

Additional attenuation can be handled by the barrel 325. For example, the barrel 325 can attenuate the attenuated optical output 305A by doping a plastic molded lens 340 that is optimally aligned to the TO-can 310. This lens 340 can be molded into the barrel 325 that includes a port 345 that will ultimately accept an optical fiber. Due to difficult design constraints, precise and tightly spaced graduations for barrel transmission values may be required to optimize overall yield. This spacing can be on the order of a few percent.

Alternate embodiments include varying degrees of attenuation on the TO-can window 315 and a fixed lens 340 attenuation. One drawback to this approach is that the amount of light on the photodetector 330 in the package 310 may have a much wider range. Therefore, the dynamic range of a feedback circuit (e.g. circuit 335 or an external circuit) used to keep constant output optical power may need to be increased. Alternatively, the window 315 can be manufactured with varying degrees of attenuation keeping the metallization amount constant. Overall, using the TO-can 310 attenuation as a coarse adjustment and the barrel 325 attenuation as a refined attenuation can maximize yields, minimized inventory, and allows for customization flexibility. Still, other methods of attenuation are covered by the algorithms disclosed herein according to examples of the present invention.

Referring again to FIG. 1, the assembly system 100 can include an optional intermediate optical device 130 sorting system 140. After the optical output of the intermediate optical device 130 has been tested it can be forwarded to a sorting component 145. The sorting component 145 can receive the intermediate optical device 130 along with information describing a result 150 of the test of an optical output parameter from the intermediate optical device 130. The sorting component 145 can be coupled to several repositories A-N 155A-N for storing intermediate optical devices, such as intermediate optical device 130, that produce optical outputs having similar parameters. For example, Package A repository 155A can receive intermediate optical devices, such as intermediate optical device 130, requiring a first attenuation to produce an optical output with a parameter value within a tolerance of the desired optical output parameter value 120. A Package B repository 155B can receive intermediate optical devices, such as intermediate optical device 130, requiring a second attenuation to produce an optical output with a parameter value within a tolerance of the desired optical output parameter value 120. Similarly, a Package N repository 155N can receive intermediate optical devices, such as intermediate optical device 130, requiring a third level of attenuation to produce an optical output having a parameter value within a tolerance of the desired optical output parameter value 120.

Thus, when each of the intermediate optical devices in repositories A, B, and N 155A-N are assembled with an appropriate barrel 135A-N having the appropriate attenuation into an assembled optical device 160, the assembled optical device 160 will have an optical output parameter value that is within the tolerance of the desired optical output value 120 and have similar output characteristics as other assembled optical devices 160 even though each laser 110A-N and/or intermediate optical device 130 has different optical output parameter values.

The general procedure for choosing a barrel or package having the needed attenuation characteristics described herein can be straightforward. However, the algorithm should take into account all the pertinent parameters or the yields of assembled optical devices 160 can be suboptimal. For example, it may often be desirable to simultaneously meet a tolerance for an eye safety open bore power requirement as well as other specifications listed in specifications such as IEEE 802.3ae. The open bore eye safety limit for one example wavelength range (840-860 nm) is approximately 1.27 dBm. In practice, downward adjustments to this limit can be made for average power tracking over a wide temperature operating range (e.g. 85 C) and aging. Thus, the typical open bore product requirements can be on the order of −1.6 dBm in this example. A tolerance can be defined as a range or set of optical output parameter values for which the values satisfy a requirement.

Figure 4A:
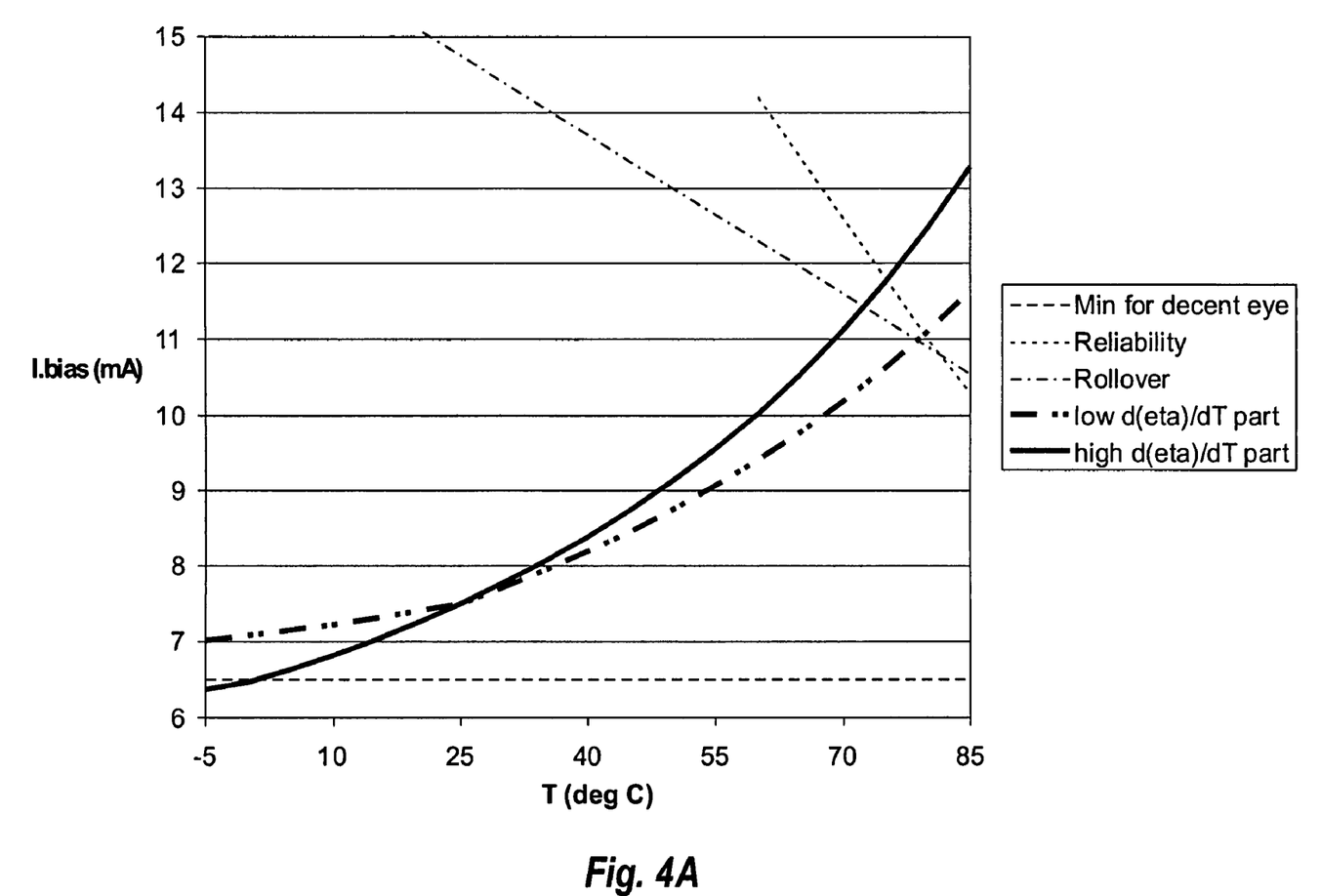
FIG. 4A illustrates an example plot of acceptable AC performance at low temperature, reliability at high temperature, current rollover at high temperature, and the change in slope efficiency as a function of temperature.
Figure 4B:
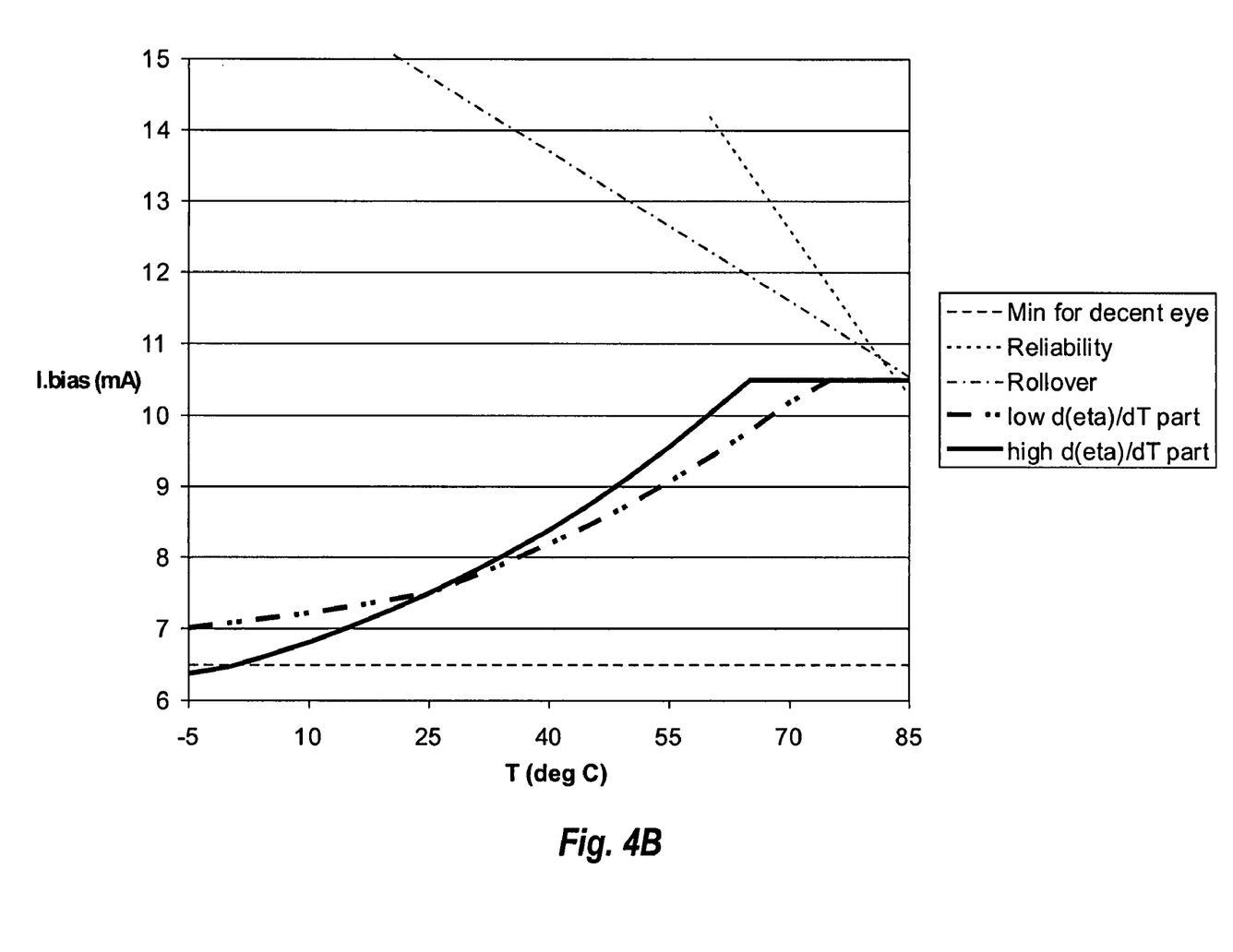
FIG. 4B illustrates an approach to apply a maximum current clamp.

Another key input to the algorithm can be the bias current value required at room temperature. This value can be a compromise between acceptable AC performance at low temperature, reliability at high temperature, current rollover at high temperature, and change in slope efficiency as a function of temperature. An example of a typical plot of this compromise is shown in FIG. 4A. In this example, a current of 7.5 mA at room temperature satisfies these requirements for all parts with a slope efficiency temperature coefficient (i.e., d(eta)/dT) of a given range. In order to satisfy the higher temperature requirements of reliability and rollover, one approach is to apply a max current clamp as shown in FIG. 4B.

Once a desired room temperature current and open bore power is known, a table can be created to choose the proper attenuation characteristics. After encapsulation in the TO-can, each intermediate optical device's power can be measured and the table can be used to determine the proper value of barrel attenuation. Generally speaking, the barrel's transmission value required can be the ratio of the open bore power desired (derated for measurement and manufacturing tolerances) and the power measured from the intermediate optical device.

One detail that can be taken into account is the vignetting of the beam on the barrel port. Vignetting is partial blockage of the outer edges of an optical beam as it exits the port with no fiber installed. This value is typically only a few percent, but can cause incorrect attenuation values to be chosen if not included. As the beam angle at a given temperature and current varies slightly between production lots, a statistical model can be used to ensure the final attenuated population does not exceed the open bore power requirement defined above.

Figure 5:
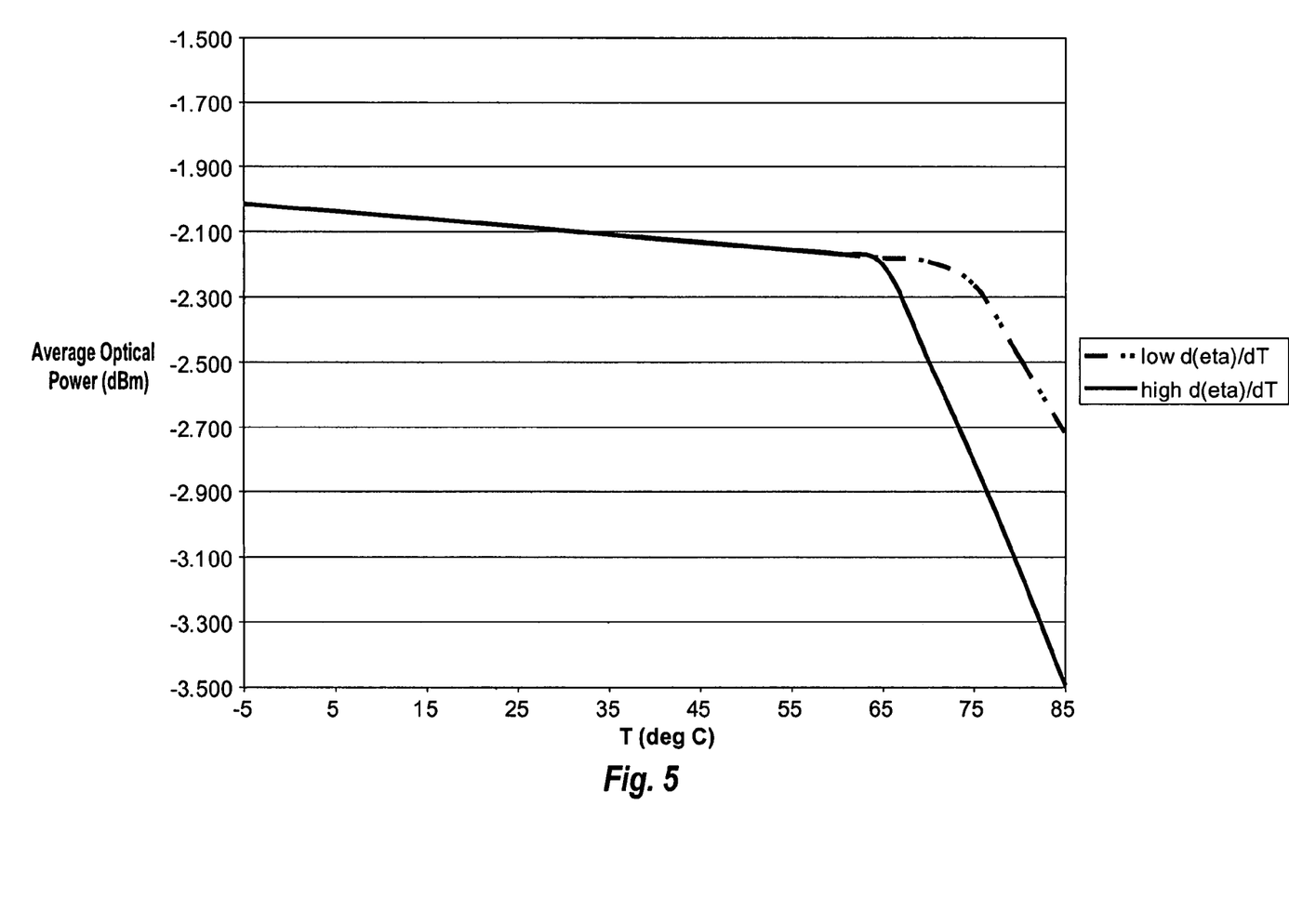
FIG. 5 illustrates how the current can reduce the average optical power available.

If under attenuated, a TOSA (or other assembled optical device) can violate the open bore requirement. If over attenuated, the problem may be less obvious. An over attenuated assembled optical device will typically have less average optical power at the same bias current than the nominal case. Thus, the VCSEL may have to be driven harder (i.e., a higher extinction ratio) to meet the optical modulation requirements. The optical modulation requirements may be dictated by the IEEE 802.3ae specification limit with additional aging and production margins applied. In limiting cases, the TOSA (or other assembled optical device) may not be able to be driven at a high enough extinction ratios to meet the AC specifications or the transmission eye shape will not pass the mask templates defined by the pertinent standards body and/or customer requirements. This problem can be exacerbated at high temperatures. The current clamp discussed above with reference to FIG. 4B may already reduce the average optical power available. An example of this effect is shown in FIG. 5. It should be noted that the value of power available over the majority of the temperature range may be set by the open bore power minus the coupling efficiency.

Overall, the margin available for choosing an appropriately attenuated barrel can be very narrow (e.g. a few percent in transmission). If all factors are not properly taken into account when choosing and assembling a barrel, the assembled optical device can fail either open bore safety margins or high temperature performance criteria. Therefore, the attenuation selection is often a critical process, for example to produce eye safe Ethernet TOSAs operating at high speeds, such as up to 10 Gbps and greater.

Figure 6:
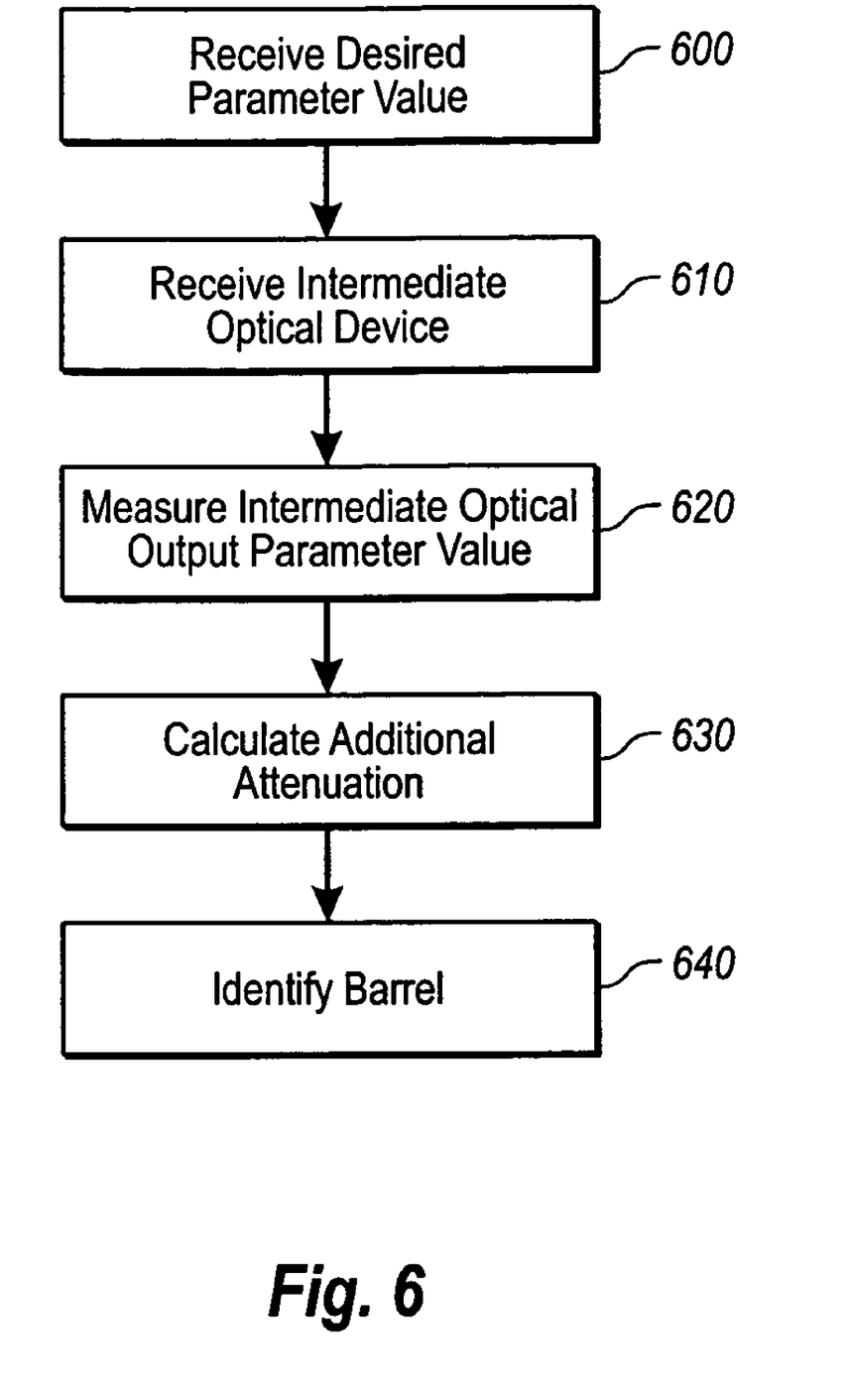
FIG. 6 illustrates a method for assembling an optical device according to an example embodiment of the present invention.

Referring to FIG. 6, a method for assembling an optical device is illustrated according to an example embodiment of the present invention. A desired value for an optical output parameter associated with an optical output from the assembled optical device can be received (600). The desired value for an optical output parameter can be several different values within a range of the desired value that will satisfy a requirement.

An intermediate optical device can be received (610). The intermediate optical device can include a laser and an optical package. The laser can be configured to produce an optical output having an unattenuated optical output parameter value. The optical package can be configured to attenuate the unattenuated optical output parameter value of the laser to produce an attenuated optical output having an intermediate value of the optical output parameter. The laser can be a VCSEL. The laser can be coupled to a substrate and die. The laser can be further coupled to a header, which can comprise electrical leads and other components. For example, a monitor photodiode and/or circuitry for controlling a parameter of an optical output from the laser can be included.

A parameter of the intermediate value of the optical output of the laser attenuated by the package can be measured (620). A test device can receive the optical output from the intermediate optical device and at least one parameter of the attenuated optical signal can be measured. Examples of parameters that can be measured are average optical power of the laser, slope efficiency of the laser, average operating current of the laser, optical modulation amplitude of the laser, or extinction ratio of the laser.

An additional amount of attenuation needed to further refine the intermediate attenuated value to within a specified tolerance of the desired parameter value can be calculated (630). The additional attenuation can be calculated by determining an amount of attenuation needed to produce a refined optical output that has parameter values that are within a tolerance of a desired optical output parameter value to meet a requirement.

A barrel can be identified based on a result of the measurement of the calculation (640). The barrel can be selected from several different barrels having different attenuation characteristics. For example, the barrels can provide a refined attenuation and the package can provide a course attenuation of the unattenuated optical output from the laser. The barrel can be assembled with the intermediate optical device to create an assembled optical device. An epoxy can be used to secure the barrel to the intermediate optical device. Other components can be included to produce the assembled optical device. For example, the assembled optical device can be an OSA, a transceiver, or other optical device.

The package can be selected for the laser prior to assembly of the intermediate optical device. The package can be selected for an attenuation of an unattenuated optical output of the laser. The package can have a window or other means for providing an attenuation of the unattenuated optical output of the laser. The package can be a TO-can package and can have a tilted can window for allowing transmission of at least a portion of the unattenuated optical output and also for reflection of a portion of the optical output toward a monitor diode. The window can also provide a course attenuation of the unattenuated optical output attenuating a parameter of the unattenuated optical output near a level that more closely satisfies a requirement. The amount of attenuation of the package can take into account an average amount of attenuation of the parameter by a set of barrels. The average amount of attenuation of the set of barrels can also relate to an attenuation of a barrel having a middle amount of attenuation of the set of barrels used for refined attenuation of the intermediate optical output form the intermediate optical device, such as a TO-can package. For example, where several barrels are later used to provide various levels of additional attenuation, the amount of attenuation of the intermediate optical package can assume that an amount of attenuation will be added by a barrel selected from several barrels with both higher and lower levels of attenuation available for providing refined attenuation of the intermediate optical output. In this manner, the final parameters of the intermediate optical output can be adjusted in either direction by selection of the barrel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for assembling an optical device, the method comprising the following acts:
   receiving a desired value for an optical output parameter associated with an optical output from the assembled optical device;
   receiving an intermediate optical device comprising:
      a laser configured to produce the optical output having an unattenuated parameter value for the optical output parameter;
      an optical package configured to attenuate the optical output such that the unattenuated value of the parameter is reduced to an intermediate value of the optical output parameter, wherein the intermediate value is closer to the desired value for the optical output parameter;
   measuring the intermediate value of the optical output parameter;
   calculating an additional attenuation needed to further refine the intermediate attenuated value to within a specified tolerance of the desired value; and
   identifying an optical barrel with characteristics that most closely provide the additional attenuation needed, wherein the optical barrel is identified from among a plurality of optical barrels with different attenuation characteristics.

2. A method of assembling a plurality of optical devices wherein each optical device is assembled according to the method of claim 1, wherein at least two of the lasers of the optical devices have different unattenuated optical output parameter values resulting in a selection of different optical barrels having different attenuation characteristics, wherein the optical output parameter value of each assembled optical device is within the specified tolerance of the desired optical output parameter value.

3. A method according to claim 1, further comprising the act of assembling the intermediate optical device and the optical barrel identified to form the assembled optical device.

4. A method according to claim 1, wherein the laser is a vertical cavity surface emitting laser, the optical package is a TO-can type optical package, and the assembled optical device is a transmit optical subassembly.

5. A method according to claim 1, wherein the optical output parameter is at least one of an average optical power of the laser, a slope efficiency of the laser, an average operating current of the laser, an optical modulation amplitude of the laser, or an extinction ratio of the laser; and wherein the specified tolerance of the desired parameter value is required to satisfy at least one of an eye safety requirement, a laser current requirement, a reliability requirement, or an industrial standard requirement.

6. A method according to claim 1, further comprising the following acts:
   selecting the laser from a plurality of lasers with different unattenuated optical output parameter values;
   selecting the optical package to attenuate the unattenuated optical output parameter value of the laser to the intermediate value of the optical output parameter, wherein the intermediate attenuated value is closer to the desired value for the laser output parameter than the unattenuated optical output parameter value; and
   coupling the laser to the optical package to form the intermediate optical device prior to receiving the intermediate optical device.

7. A method according to claim 6, further comprising the act of sorting the laser along with other lasers into groups of lasers with similar optical output parameters prior to assembling the optical package and the laser.

8. A method according to claim 1, further comprising the act of sorting the intermediate optical device along with other intermediate optical devices based on the measurement of the intermediate value of the optical output parameter prior to assembling the intermediate optical device and the optical barrel.

9. A system for assembling an optical device comprising:
   a testing component for measuring an optical output parameter value of an intermediate optical device, the intermediate optical device comprising a laser and an optical package; and
   a component for receiving a desired optical output parameter value, and for selecting an optical barrel having an attenuation characteristic from a plurality of optical barrels having different attenuation characteristics, wherein the optical barrel is selected to most closely attenuate the optical output parameter value of the intermediate optical device within a specified tolerance of the desired optical output parameter value.

10. A system according to claim 9, further comprising an intermediate assembly device for assembling the intermediate optical device, wherein the laser produces an optical output having an unattenuated optical output parameter value and the optical package provides a course attenuation of the unattenuated optical output parameter value, and wherein the barrel provides a refined attenuation of the unattenuated optical output parameter value to meet the specified tolerance of the desired optical output parameter value.

11. A system according to claim 9, wherein the component is further configured to assemble the optical package and the optical barrel selected.

12. A system according to claim 9, wherein the laser is a vertical cavity surface emitting laser, the optical package is a TO-can type optical package, and the assembled optical device is a transmit optical subassembly.

13. A system according to claim 9, wherein a plot of acceptable AC performance at low temperature, reliability at high temperature, current rollover at high temperature, and change in slope efficiency as a function of temperature is used to select the optical barrel.

14. A system according to 9, further comprising a sorting component for sorting the laser along with other lasers into groups of lasers with similar unattenuated optical output parameter values prior to assembling the intermediate optical device.

15. A system according to 9, further comprising a sorting component for sorting the intermediate optical device along with other intermediate optical devices based on the measurement prior to assembling the intermediate optical device and the optical barrel.

16. A system according to claim 9, wherein the optical output parameter is at least one of an average optical power of the laser, a slope efficiency of the laser, an average operating current of the laser, an optical modulation amplitude of the laser, or an extinction ratio of the laser; and wherein the specified tolerance of the desired parameter value is required to satisfy at least one of an eye safety requirement, a laser current requirement, a reliability requirement, or an industrial standard requirement.

17. An assembled optical device assembled by the system of claim 9, wherein the optical output parameter value of the assembled optical device is within the specified tolerance of the desired optical output parameter value.

* * * * *

UNITED STATES PATENT AND TRADEMARK OFFICE
CERTIFICATE OF CORRECTION

PATENT NO. : 7,275,878 B2  Page 1 of 1
APPLICATION NO. : 11/130511
DATED : October 2, 2007
INVENTOR(S) : Laundry et al.

It is certified that error appears in the above-identified patent and that said Letters Patent is hereby corrected as shown below:

Title Page, item [74] col. 2
*Primary Examiner*, change "Rahill" to --Rahll--

Column 2
Line 12, change "802.3 ae" to --802.3ae--

Column 5
Line 10, after "and one" insert --for assembly.--
Line 18, change "assembled optical package" to --intermediate optical device--

Column 6
Line 7, change "46" to --46--
Lines 12-13, change "photo detector" to --photodiode--
Line 20, change "TO-can 310" to --intermediate optical device 310--
Line 29, change "photodetector" to --photodiode--
Line 29, change "package 310" to --intermediate optical device 310--
Line 35, change "TO-can 310" to --intermediate optical device 310--
Lines 37-38, change "minimized" to --minimize--

Column 9
Line 27, change "form" to --from--

Signed and Sealed this

Thirty-first Day of August, 2010

David J. Kappos
*Director of the United States Patent and Trademark Office*